US009237144B2

(12) United States Patent
Chen et al.

(10) Patent No.: US 9,237,144 B2
(45) Date of Patent: Jan. 12, 2016

(54) METHOD, DEVICE AND SYSTEM FOR VERIFYING BASED ON VERIFICATION DIAGRAM, AND STORAGE MEDIUM

(71) Applicant: Tencent Technology (Shenzhen) Company Limited, Guangdong (CN)

(72) Inventors: Ningguo Chen, Guangdong (CN); Jianwei Deng, Guangdong (CN); Songjian Wang, Guangdong (CN); Ruizhou Wu, Guangdong (CN); Yun Zhang, Guangdong (CN); Lijuan Zhao, Guangdong (CN); Cong Fu, Guangdong (CN); Ruting Chen, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 113 days.

(21) Appl. No.: 14/245,622

(22) Filed: Apr. 4, 2014

(65) Prior Publication Data

US 2014/0317700 A1    Oct. 23, 2014

Related U.S. Application Data

(63) Continuation of application No. PCT/CN2013/088629, filed on Dec. 5, 2013.

(30) Foreign Application Priority Data

Apr. 18, 2013   (CN) .......................... 2013 1 0135148

(51) Int. Cl.
*G06F 7/04*    (2006.01)
*H04L 29/06*   (2006.01)
*G06F 21/00*   (2013.01)

(52) U.S. Cl.
CPC ................ *H04L 63/08* (2013.01); *G06F 21/00* (2013.01)

(58) Field of Classification Search
CPC .......... H04L 63/08; G06F 21/31; G06F 21/36
USPC ........................................................... 726/5
See application file for complete search history.

(56) References Cited

U.S. PATENT DOCUMENTS 8,601,560 B2*   12/2013   Kim ..................... G06F 21/305
                                                        709/217
8,683,550 B2*   3/2014    Hung .................... G06F 21/335
                                                        709/217
(Continued)

FOREIGN PATENT DOCUMENTS

| CN | 101159715 | 4/2008 |
| CN | 101676926 | 3/2010 |
| CN | 102075507 | 5/2011 |
| CN | 102650927 | 8/2012 |
| TW | 201235930 | 9/2012 |

OTHER PUBLICATIONS

International Search Report, PCT/CN2013/088629, Tencent Technology (Shenzhen) Company Limited, Mar. 13, 2014.
(Continued)

*Primary Examiner* — Teshome Hailu
(74) *Attorney, Agent, or Firm* — McDonald Hopkins LLC

(57) ABSTRACT

The invention discloses a method, a device and a system for verifying based on a verification diagram, and a storage medium, and the method includes: generating an input interface diagram according to a verification diagram including a basic information element and verification information, where the input interface diagram includes the basic information element of the verification diagram except for the verification information; transmitting the verification diagram and the input interface diagram to a terminal; receiving sliding path information inputted on the input interface diagram presented on the terminal; and determining whether the sliding path information matches the verification information, and if so, the verification is successful. The invention is advantageous for preventing the erroneous verification information inputted into a verification code input box caused due to an erroneous touch on an input keyboard, thereby improving the success rate of login authentication on a terminal user by a web-hosting server.

18 Claims, 4 Drawing Sheets

(a)

(b)

(56) References Cited

U.S. PATENT DOCUMENTS

| | | | | |
|---|---|---|---|---|
| 8,763,096 B1* | 6/2014 | Hernacki | H04L 63/08 | 707/602 |
| 8,856,541 B1* | 10/2014 | Chaudhury | G06F 21/32 | 382/115 |
| 9,038,167 B2* | 5/2015 | Fadell | G06F 21/316 | 713/182 |
| 2009/0083850 A1* | 3/2009 | Fadell | G06F 21/316 | 726/19 |
| 2013/0082819 A1* | 4/2013 | Cotterill | G06F 21/35 | 340/5.51 |
| 2013/0347101 A1* | 12/2013 | Wu | G06F 3/04883 | 726/19 |
| 2014/0325220 A1* | 10/2014 | Tunnell | G06F 21/00 | 713/168 |

OTHER PUBLICATIONS

Patent Abstract of CN101159715, Safety Information Checking Method and Safety Information Checking Device and Client Terminal, Tencent Tech. Shenzhen Co. Ltd., Apr. 9, 2008.

Patent Abstract of CN101676926, Touch Type Electronic Equipment and its Authority Control Method, Shenzhen Futaihong Prec Ind. Co. Chi Mei Comm., Mar. 24, 2010.

Patent Abstract of CN102075507, User Verification Method and Equipment Based on Word-Sentence Verification Diagram, Baidu on Line Network Technology (Beijing) Co. Ltd., May 25, 2011.

Chinese Office Action for Chinese Patent Application No. 201310135148.1, dated Feb. 13, 2015.

* cited by examiner

US 9,237,144 B2

METHOD, DEVICE AND SYSTEM FOR VERIFYING BASED ON VERIFICATION DIAGRAM, AND STORAGE MEDIUM

CROSS-REFERENCE TO RELATED APPLICATIONS

This application claims priority to and is a continuation application of PCT/CN2013/088629, filed on Dec. 5, 2013 and entitled "METHOD, DEVICE AND SYSTEM FOR VERIFYING BASED ON VERIFICATION DIAGRAM AND STORAGE MEDIUM", which claims the benefit of Chinese Application No. 201310135148.1 filed on Apr. 18, 2013 by Shenzhen Tencent Computer System Co., Ltd, titled "METHOD, DEVICE AND SYSTEM FOR VERIFYING BASED ON VERIFICATION DIAGRAM", which are incorporated herein by reference in their entirety.

FIELD OF THE INVENTION

The present invention relates to the field of mobile communication technologies, specifically to the field of Internet security technologies, and more specifically to a method, a device and a system for verifying based on a verification diagram, and a storage medium.

BACKGROUND OF THE INVENTION

With the rapid development of a mobile Internet technology, various applications have emerged. When using the applications, a user is sometimes required to experience an authentication on account name login to enjoy more and further services. To prevent an attack from a malicious automated login tool on a terminal, a web-hosting server transmits a verification diagram and a verification input box to the terminal. The verification diagram is formed by interfering patters or symbols, and verification information including a group of randomly generated digits and/or symbols. The terminal user understands the verification information in the verification diagram and then inputs the verification information into the verification input box. The web-hosting server completes the login authentication on the terminal user by determining the correctness of the input information in the verification input box.

However, for the existing terminals such as mobile phones, tablet computers, personal digital assistants and other mobile electronic devices, the terminal user needs to input characters one by one when inputting the verification information. When the terminal display screen is relatively small, an erroneous touch to a small input keyboard can be easily caused, leading to the errors of the verification information inputted in the validation input box, thus affecting the login authentication on the terminal user by the web-hosting server.

SUMMARY OF THE INVENTION

In view of this, the invention is to provide a method, a device and a system for verifying based on a verification diagram, and a storage medium, for the purpose of improving the convenience and accuracy of the verification information inputted at the terminal.

At a first aspect, an embodiment of the invention provides a method for verifying based on a verification diagram, and the method is performed on a server and includes:

generating an input interface diagram according to a verification diagram including a basic information element and verification information, where the input interface diagram includes the basic information element of the verification diagram except for the verification information;

transmitting the verification diagram and the input interface diagram to a terminal;

receiving sliding path information inputted on the input interface diagram presented on the terminal; and determining whether the sliding path information matches the verification information, and if so, then the verification is successful.

At a second aspect, an embodiment of the invention provides a device for verifying based on a verification diagram, and the device is arranged at a server and includes:

a diagram generating module configured for generating an input interface diagram according to the verification diagram including a basic information element and verification information, where the input interface diagram includes the basic information element of the verification diagram except for the verification information;

a diagram transmitting module configured for transmitting the verification diagram and the input interface diagram to a terminal;

a path receiving module configured for receiving sliding path information inputted on the input interface diagram presented on the terminal; and a verifying module configured for determining whether the sliding path information matches the verification information, and if so, then the verification is successful.

At a third aspect, an embodiment of the invention provides a system for verifying based on a verification diagram, including a server and at least one terminal;

the server is configured for generating an input interface diagram according to the verification diagram including a basic information element and verification information, the input interface diagram includes the basic information element of the verification diagram except for the verification information;

the server is further configured for transmitting the verification diagram and the input interface diagram to at least one terminal;

the at least one terminal is configured for detecting a touch signal applied to the presented input interface diagram after the verification diagram and the input interface diagram transmitted by the server are presented, and transmitting sliding path information generated according to the touch signal to the server; and the server is further configured for determining whether the sliding path information matches the verification information after receiving the sliding path information, and if so, then the verification is successful.

At a fourth aspect, an embodiment of the invention provides a method for verifying based on a verification diagram, and the method is performed on a terminal and includes:

receiving a verification diagram and an input interface diagram from a server, where the input interface diagram includes a basic information element of the verification diagram except for verification information;

detecting a touch signal applied to the presented input interface diagram by a user after the verification diagram and the input interface diagram transmitted by the server are presented; and transmitting sliding path information generated according to the touch signal to the server for verifying.

At a fifth aspect, an embodiment of the invention provides a device for verifying based on a verification diagram, and the device is at a terminal and includes:

an interface receiving module configured for receiving the verification diagram and an input interface diagram from a server, where the input interface diagram includes the basic information element of the verification diagram except for the verification information;

a touch detecting module configured for detecting a touch signal applied to the presented input interface diagram by a user after the verification diagram and the input interface diagram transmitted by the server are presented; and a verification transmitting module configured for transmitting sliding path information generated according to the touch signal to the server for verifying.

At a sixth aspect, an embodiment of the invention provides a storage medium containing computer-executable instructions, and the computer-executable instructions, when executed by a computer processor, are configured to perform a method for verifying based on a verification diagram, where the method is performed on a server and includes:

generating an input interface diagram according to the verification diagram including a basic information element and verification information, where the input interface diagram includes the basic information element of the verification diagram except for the verification information;

transmitting the verification diagram and the input interface diagram to a terminal;

receiving sliding path information inputted on the input interface diagram presented on the terminal; and determining whether the sliding path information matches the verification information, and if so, then the verification is successful.

At a seventh aspect, an embodiment of the invention provides a storage medium containing computer-executable instructions, and the computer-executable instructions, when executed by a computer processor, are configured to perform a method for verifying based on a verification diagram, where the method is performed on a terminal and includes:

receiving a verification diagram and an input interface diagram from a server, where the input interface diagram includes the basic information element of the verification diagram except for the verification information;

detecting a touch signal applied to the presented input interface diagram by a user after the verification diagram and the input interface diagram transmitted by the server are presented; and transmitting sliding path information generated according to the touch signal to the server for verifying.

The technical solution proposed by the invention, without decreasing the security, receives sliding path information generated by a terminal through a touch on an input interface diagram after transmitting a verification diagram and an input interface diagram to the terminal, determines whether the sliding path information matches the verification information of the verification diagram, in order to prevent erroneous input of the verification information caused by the erroneous touch on a terminal input keyboard, thereby improving the success rate of login authentication on a terminal user by a web-hosting server as well as the convenience and accuracy of the verification information inputted by the terminal.

BRIEF DESCRIPTION OF THE DRAWINGS

For more clearly illustrating the technical solutions in the embodiments of the invention, the drawings used in the embodiment description will be briefly illustrated below. Certainly, the following described drawings are only some embodiments of the invention, various modifications and substitutions can be made to the drawings for those skilled at the art without paying any creative work.

DETAILED DESCRIPTION OF THE EMBODIMENTS

Figure 1:
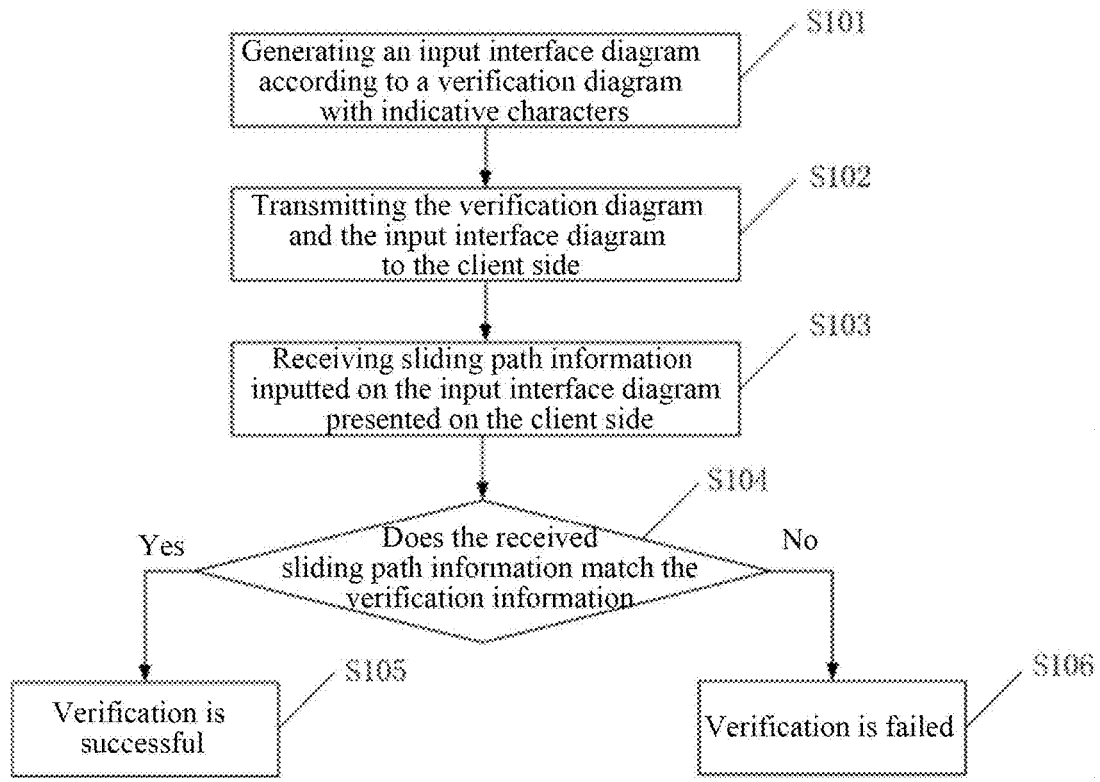
FIG. 1 is a schematic flow chart of a method for verifying based on a verification diagram according to the first embodiment of the invention.

The invention will be further illustrated in conjunction with the drawings and the embodiments. It should be understood that, the specific embodiments described herein are only used to explain the invention, rather than limiting the invention. It also should be noted that, for convenience of description, only the part relevant to the invention is shown in the drawings, rather than all the content. Based on the embodiments of the invention, all other embodiments, which are obtained by those skilled in the art without paying any creative efforts, are contained the protection scope of the invention.

Figure 2:
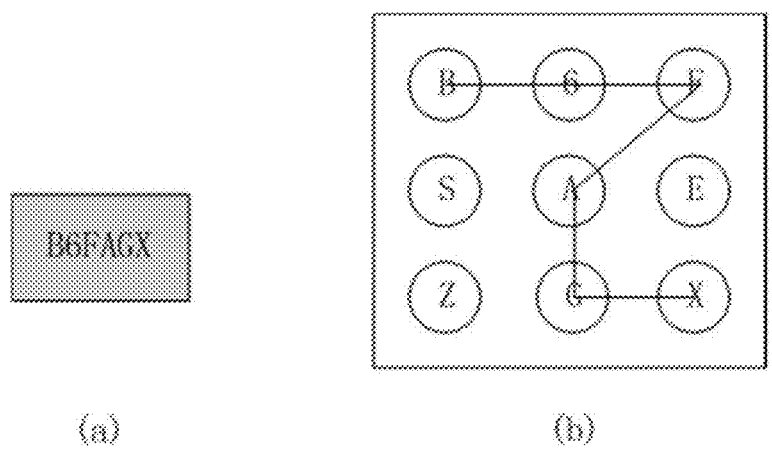
FIG. 2 is a schematic diagram of a verification diagram with indicative characters and the corresponding input interface diagram according to the first embodiment of the invention.

FIGS. 1 and 2 illustrate the first embodiment of the invention.

FIG. 1 is a schematic flow chart of a method for verifying based on a verification diagram according to the first embodiment of the invention. The method may be performed by a device that is arranged at a server and configured for verifying based on a verification diagram. Referring to FIG. 1, the method is performed on the server and includes:

Step S101: generating an input interface diagram according to a verification diagram with indicative characters.

The input interface diagram is generated according to the verification diagram including a basic information element and verification information.

Preferably, the basic information element includes at least one sub-element, and the verification information is a combination sequence of the at least one sub-element, where the at least one sub-element includes at least one from a group consisted of alphabets, digits and patters. It should be understood that, the sub-elements may be merely the alphabets, the digits or the patterns, or may be of any combination of the alphabets, the digits and the patterns above, where the patterns may be small recognizable patterns such as patterns of animal, portrait and plant. The characters act as the sub-elements for illustrating in the embodiment, but it should be understood that other sub-elements can also be applied to the various technical solutions of the embodiments for those skilled in the art.

The embodiment takes specifically the verification diagram with indicative characters as an example for illustrating. The verification diagram with indicative characters includes the basic information element and the verification information in the embodiment. The basic information element may include at least one character, and the verification information is the combination sequence of the at least one character. For example, the basic information element includes six characters such as A, B, F, G, X and 6, and the verification information is the combination sequence of the six characters such as B6FAGX. The input interface diagram includes the basic information element of the verification diagram except for the verification information. Preferably, the input interface diagram includes at least more than one identified area, each of which displays one character, and characters displayed by the at least more than one identified area include all the characters in the basic information element.

Correspondingly, a realization process of generating the input interface diagram according to the verification diagram includes:

generating at least more than one identified area on the input interface diagram, where the number of the more than one identified area is greater than or equal to that of the characters in the basic information element of the verification diagram, and the at least one identified area may be arranged and displayed in an L×N matrix, where L and N are integers more than 1, respectively;

presetting randomly a sliding trace on the input interface diagram according to the verification diagram to generate the sliding path information, where the sliding trace is continuous, the number of the identified areas passed through by the sliding trace is just the same as that of the characters in the basic information element of the verification diagram, the sliding path information includes a sequence of the various identified areas passed through successively by the sliding trace randomly preset;

displaying the various characters of the basic information element in the identified areas passed through by the sliding trace according to the verification information of the verification diagram, where each identified area displays one character correspondingly;

randomly displaying other characters at the identified areas not passed through by the sliding trace.

In view of simplistic verification information, vulnerability to malicious tools and low security when the basic information element includes one or two characters, the basic information element includes at least more than three characters and the input interface diagram includes at least more than three identified areas in a preferred embodiment.

FIG. 2 is a schematic diagram of a verification diagram with indicative characters and the corresponding input interface diagram according to the first embodiment of the invention. FIG. 2 (a) illustrates the verification diagram with indicative characters, the basic information element contained therein is A, B, F, G, X and 6 and the verification information contained therein is B6FAGX. FIG. 2 (b) illustrates the input interface diagram corresponding to such a verification diagram, and the input interface diagram includes nine identified areas which are arranged in a 3×3 matrix and successively display B6FSAEZGX. The sliding path information generated by the preset sliding trace is represented by three identified areas in the first row of the matrix, the second identified area in the second row of the matrix and the last two identified areas in the third row of the matrix, which are passed through successively by the sliding trace. The nine identified areas may be identified as 1, 2, 3, 4, 5, 6, 7, 8 and 9, then the sliding path information corresponding to the verification information, i.e., B6FAGX, is 1, 2, 3, 5, 8 and 9.

Step S102: transmitting the verification diagram and the input interface diagram to a terminal.

The verification diagram and the input interface diagram may be transmitted to the terminal by a wired way or a wireless way in the embodiment. The terminal may be of an application login interface system.

Step S103: receiving sliding path information inputted on the input interface diagram presented on the terminal.

In the embodiment, after the verification diagram and the input interface diagram are received by the terminal, the terminal may obtain a sliding trace on the input interface diagram by detecting a touch signal caused by a touch of the terminal user on the input interface diagram, and generate the corresponding sliding path information. The sliding path information includes a sequence of the various identified areas passed through successively by the sliding trace.

Step S104: determining whether the sliding path information matches the verification information, and if so, performing Step S105; otherwise, performing Step S106.

Preferably, determining whether the sliding path information received in Step S103 matches the verification information includes: analyzing the sliding path information received in Step S103 to obtain a character combination sequence corresponding to the sliding path information; comparing whether the character combination sequence is consistent with the verification information of the verification diagram, and if so, determining that the received sliding path information matches the verification information; otherwise, determining that the sliding path information received does not match the verification information.

In the embodiment, the sliding path information received in Step S103 (a sequence of the various identified areas passed through successively by the sliding trace) may be analyzed and a character combination sequence corresponding to the sliding path information may be obtained according to the characters displayed by the various identified areas in the input interface diagram.

Step S105: determining that the verification is successful.

Step S106: determining that the verification is failed.

In the embodiment, as for the verification diagram with indicative characters and the corresponding input interface diagram shown in FIG. 2, if the received sliding path information inputted on the input interface diagram presented on the terminal are 1, 2, 3, 6, 9, 8, according to the characters displayed by the various identified areas in the input interface diagram, a character combination sequence corresponding to the sliding path information is obtained as B6FEXG after the received sliding path information is analyzed; by comparison, the character combination sequence B6FEXG is inconsistent with the verification information, i.e., B6FAGX, that is, the received sliding path information does not match the verification information, and the verification is determined as failed;

if the received sliding path information inputted on the input interface diagram presented on the terminal are 1, 2, 3, 5, 8, 9, according to the characters displayed by the various identified areas in the input interface diagram, a character combination sequence corresponding to the sliding path information is obtained as B6FAGX after the received sliding path information is analyzed; by comparison, the character combination sequence B6FAGX is consistent with the verification information, i.e., B6FAGX, that is, the received sliding path information matches the verification information, and determining the verification as successful.

In a preferred embodiment, in Step S104, the sliding path information received in Step S103 may also be directly compared with the sliding path information caused according to the preset sliding trace in Step S101 to determine whether the former is consistent with the latter, thus determining whether the sliding path information received in Step S103 matches the verification information.

Figure 3:
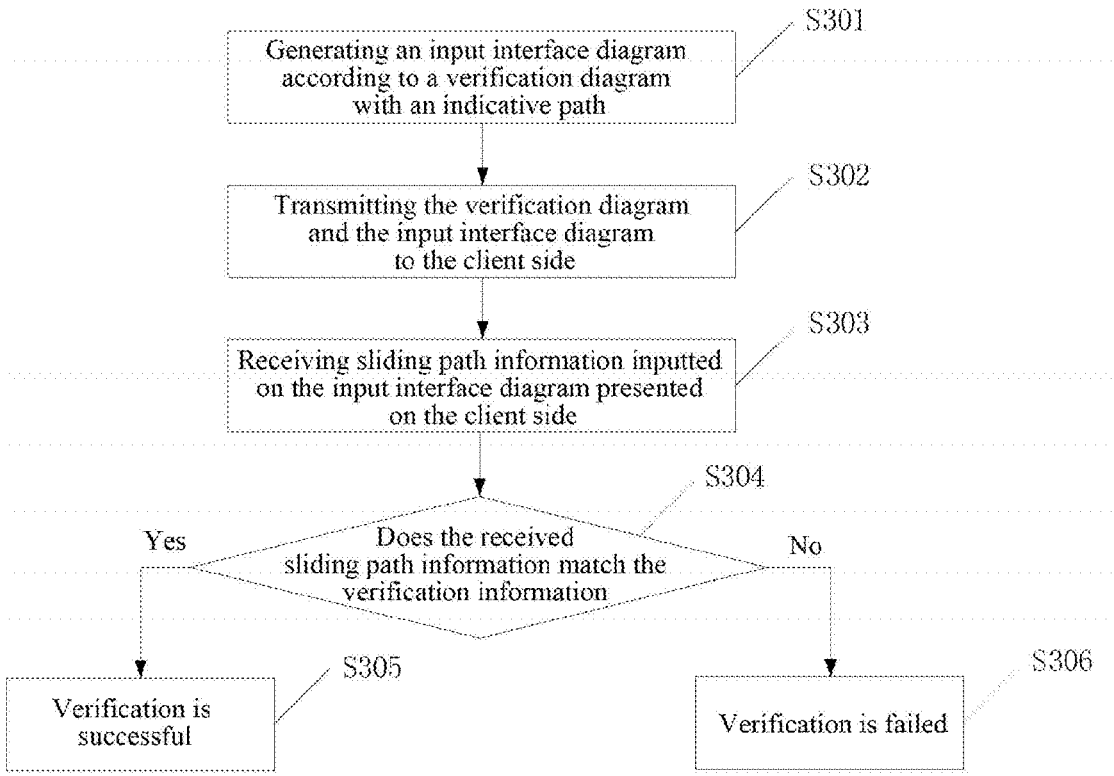
FIG. 3 is a schematic flow chart of a method for verifying based on a verification diagram according to the second embodiment of the invention.
Figure 4:
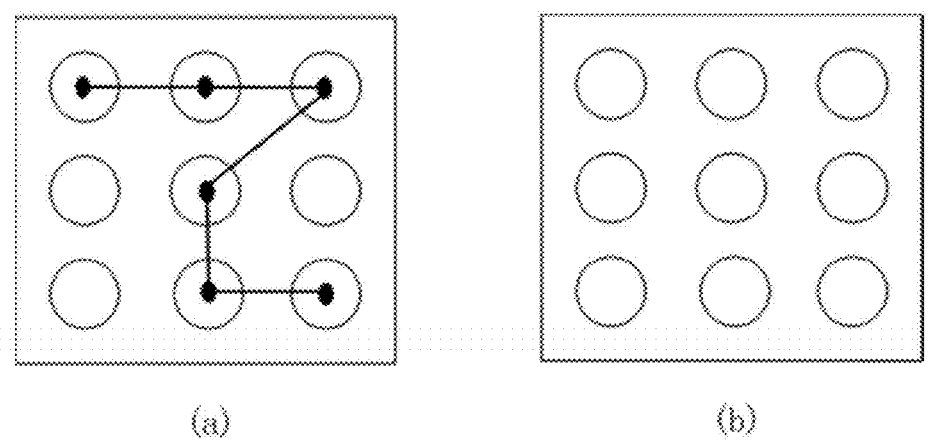
FIG. 4 is a schematic diagram of a verification diagram with an indicative path and the corresponding input interface diagram according to the second embodiment of the invention.

FIGS. 3 and 4 illustrate the second embodiment.

FIG. 3 is a schematic flow chart of a method for verifying based on a verification diagram according to the second embodiment of the invention. Referring to FIG. 3, the method includes:

Step S103: generating an input interface diagram according to the verification diagram with an indicative path.

The input interface diagram is generated according to the verification diagram including a basic information element and verification information. The embodiment takes specifically the verification diagram with an indicative path for an example for illustrating. In the embodiment, the verification diagram with an indicative path includes the basic information element and the verification information, the basic information element includes at least one identify area, and the verification information of the verification diagram is a sequence of the various identified areas passed through successively by the preset sliding trace on the verification diagram. Preferably, the at least one identified area may be arranged and displayed in a P×Q matrix, P and Q herein are integers more than 1, respectively. The input interface diagram includes the basic information element of the verification diagram except for the verification information, i.e., the input interface diagram includes at least one identified area, the various identified areas of the input interface diagram are the same as those of the above verification diagrams, respectively.

In view of simplistic verification information, vulnerability to the malicious tool and low security when the number of the various identified areas passed through successively by the preset sliding trace is one or two, the number of the various identified areas passed through successively by the preset sliding trace is at least three, and the verification diagram and the input interface diagram include at least more than three identified areas in a preferred embodiment.

FIG. 4 is a schematic diagram of a verification diagram with an indicative path and corresponding input interface diagram according to the second embodiment of the invention. FIG. 4 (a) illustrates a verification diagram with an indicative path, the basic information element of the verification diagram includes nine identified areas arranged in a 3×3 matrix, and the verification information of the verification diagram includes three identified areas in the first row of the matrix, the second identified area in the second row of the matrix and the last two identified areas in the third row of the matrix, which are passed through successively by the preset sliding trace. FIG. 4 (b) illustrates the input interface diagram corresponding to the verification diagram with an indicative path, and the input interface diagram includes nine identified areas which are the same as those in the verification diagram and arranged in a 3×3 matrix.

Step S302: transmitting the verification diagram and the input interface diagram to a terminal.

Step S302 is the same as Step S102 in the first embodiment, and thus is not repeated herein.

Step S303: receiving sliding path information inputted on the input interface diagram presented on the terminal.

Step S303 is the same as Step S103 in the first embodiment, and thus is not repeated herein.

Step S304: determining whether the sliding path information received in Step S303 matches the verification information, and if so, performing Step S305; otherwise performing Step S306.

In the embodiment, the sliding path information received in Step S303 is compared with the verification information contained in the verification diagram to determine whether the former is consistent with the latter, and if so, then the received sliding path information is determined to be consistent with the verification information, otherwise the received sliding path information is determined to be inconsistent with the verification information.

Step S305: determining the verification as successful.

Step S306: determining the verification as failed.

The technical solution provided by the various embodiments of the invention is described by taking the combination sequence of the sub-elements as the verification information, but it should be understood that the verification information may be the various forms for those skilled in the art. For example, the basic information element includes one sub-element, and the verification information is of the number or the representation form of the sub-elements. For example, the sub-element is an animal pattern or the name of the animal, while the verification information is the occurrence number of the animal. According to the sub-elements and the number thereof, the sub-elements exceeding the number are displayed in the various identified areas of the input interface diagram generated, other identified areas are filled with other elements. Thereby, the user only chooses the animal pattern or animal name meeting the number to achieve the verification. If there is no the specific number requirement, it means that all identified areas of the animal in the input interface diagram should be chosen. It can be seen that the verification information may be the various input requirements on the sub-elements, so long as it meets that the user can input information by touching the identified areas.

Figure 5:
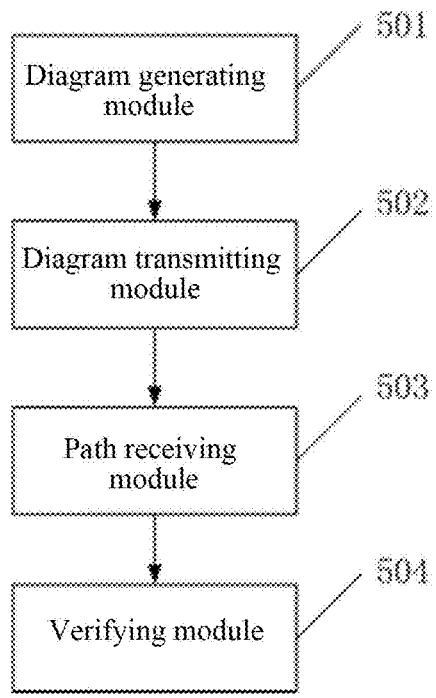
FIG. 5 is a schematic diagram of a device for verifying based on a verification diagram according to the third embodiment of the invention.

FIG. 5 illustrates the third embodiment of the invention.

FIG. 5 is a schematic diagram of a device for verifying based on a verification diagram according to the third embodiment of the invention. Referring to FIG. 5, the device includes: a diagram generating module 501 configured for generating an input interface diagram according to a verification diagram including a basic information element and verification information, where the input interface diagram includes the basic information element of the verification diagram except for the verification information; a diagram transmitting module 502 configured for transmitting the verification diagram and the input interface diagram to a terminal; a path receiving module 503 configured for receiving sliding path information inputted on the input interface diagram presented on the terminal; and a verifying module 504 configured for determining whether the sliding path information matches the verification information, and if so, then the verification is successful.

The basic information element may include at least one sub-element, and the verification information is a combination sequence of the at least one sub-element, where, the at least one sub-element includes at least one from a group consisted of alphabets, digits and patters. The embodiment of the invention will be described by taking the characters as the sub-elements, but other sub-elements can also be applied.

The verification diagram is the verification diagram with indicative characters or the verification diagram with an indicative path in the embodiment.

The verification diagram with indicative characters may include the basic information element including at least one character, and the verification information, which is a combination sequence of the at least one character. The input interface diagram includes the basic information element of the verification diagram except for the verification information. Preferably, the input interface diagram includes at least more than one identified area, each of which displays one character, and characters displayed by the at least more than one identified area contain all the characters in the basic information element. A process of generating the input interface diagram according to the verification diagram includes:

generating at least more than one identified area on the input interface diagram, where the number of the more than one identified area is greater than or equal to that of the characters in the basic information element of the verification diagram, and the more than one identified area may be arranged and displayed in an L×N matrix, L and N herein are integers more than 1, respectively;

presetting randomly a sliding trace on the input interface diagram according to the verification diagram to generate the sliding path information, where the sliding trace is continuous, the number of the identified areas passed through by the sliding trace is just the same as that of the characters in the basic information element of the verification diagram, and the sliding path information includes a sequence of the various identified areas passed through successively by the sliding trace randomly preset;

displaying the various characters of the basic information element in the identified areas passed through by the sliding trace according to the verification information of the verification diagram, each identified area displays one character correspondingly;

randomly displaying other characters at the identified areas not passed through by the sliding trace.

The verification diagram with an indicative path may include the basic information element including at least one identified area, and the verification information, which is a sequence of the various identified areas passed through successively by the preset sliding trace on the verification diagram. Preferably, the at least one identified area may be arranged and displayed in a P×Q matrix, P and Q herein are integers more than 1, respectively. The input interface diagram includes the basic information element of the verification diagram except for the verification information, i.e., the input interface diagram includes at least one identified area, the various identified areas of the input interface diagram is the same as those of the above verification diagrams, respectively.

The diagram transmitting module 502 may transmit the verification diagram and the input interface diagram to the terminal by a wired way or a wireless way in the embodiment. The terminal may be of an application login interface system.

In the embodiment, after the verification diagram and the input interface diagram are received by the terminal, the terminal may obtain a sliding trace on the input interface diagram by detecting a touch signal caused by a touch of the terminal user on the input interface diagram, and generate the corresponding sliding path information. The sliding path information includes a sequence of the various identified areas passed through successively by the sliding trace. The path receiving module 503 receives the sliding path information generated by the terminal.

In the embodiment, in the case of the verification diagram with indicative characters, the verifying module 504 determining whether the sliding path information received by the receiving module 503 matches the verification information in the verification diagram includes:

analyzing the sliding path information received by the receiving module 503 to obtain a character combination sequence corresponding to the sliding path information; comparing whether the character combination sequence is consistent with the verification information of the verification diagram, and if so, determining that the received sliding path information matches the verification information, otherwise determining that the received sliding path information does not match the verification information.

In the embodiment, in the case of the verification diagram with an indicative path, the sliding path information received by the receiving module 503 may also be directly compared with the verification information contained in the verification diagram by the verifying module 504, to determine whether the former is consistent with the latter, and if so, the sliding path information received is determined to be consistent with the verification information, otherwise the sliding path information received is determined to be inconsistent with the verification information.

Figure 6:
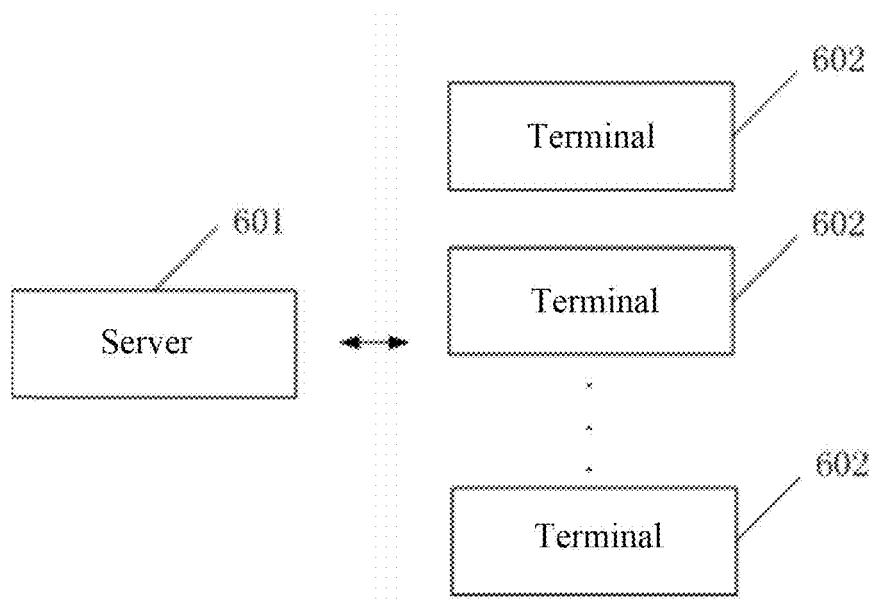
FIG. 6 is a schematic diagram of a system for verifying based on a verification diagram according to the fourth embodiment of the invention.

FIG. 6 illustrates the fourth embodiment of the invention.

FIG. 6 is a schematic diagram of a system for verifying based on a verification diagram according to the fourth embodiment of the invention. Referring to FIG. 6, the system includes a server 601 and at least one terminal 602. The server 601 is configured for generating an input interface diagram according to a verification diagram including a basic information element and verification information, where the input interface diagram includes the basic information element of the verification diagram except for the verification information; the server 601 is further configured for transmitting the verification diagram and the input interface diagram to the terminal 602; the terminal 602 is configured for detecting a touch signal applied to the presented input interface diagram after the verification diagram and the input interface diagram transmitted by the server are presented, and transmitting the sliding path information generated according to the touch signal to the server 601; the server 601 is also configured for receiving the sliding path information, and determining whether the sliding path information matches the verification information, and if so, then the verification is successful.

The function of the server 601 for verifying based on the verification diagram in the embodiment is identical with the function of the device for verifying based on the verification diagram in the third embodiment, and thereby is not repeated herein.

In the embodiment, the terminal may be a software terminal, such as a web browser capable of displaying the verification diagram and the input interface diagram; may also be a hardware terminal, such as a desktop computer, a laptop computer, a palmtop computer, a personal digital assistant (PDA), a handheld electronic processing device, a smartphone combining the function of the PDA with the function of the phone, iPod or any other electronic device capable of displaying the verification diagram and the input interface diagram and detecting the touch signal applied by the user.

Figure 7:
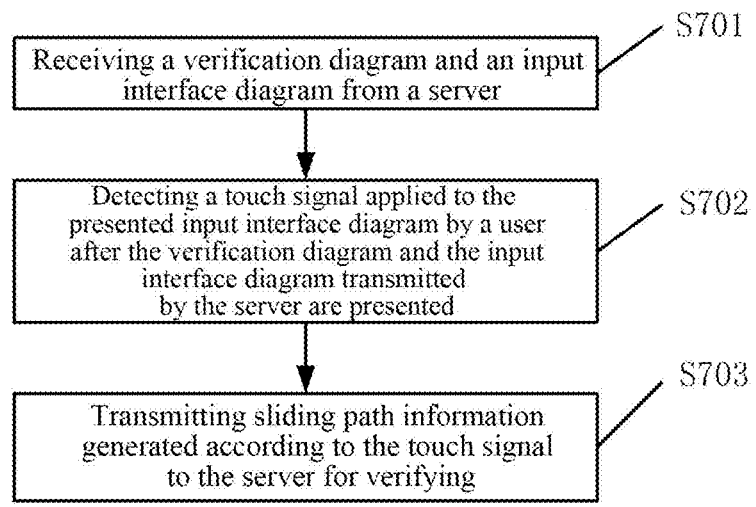
FIG. 7 is a schematic flow chart of a method for verifying based on a verification diagram according to the fifth embodiment of the invention.

FIG. 7 illustrates the fifth embodiment of the invention.

FIG. 7 is a schematic flow chart of a method for verifying based on a verification diagram according to the fifth embodiment of the invention. The method may be performed by a device that is arranged at a terminal and configured for verifying based on the verification diagram. Referring to FIG. 7, the method is performed on the terminal and includes:

Step S701: receiving a verification diagram and an input interface diagram from a server, where the input interface diagram includes a basic information element of the verification diagram except for verification information;

Step S702: detecting a touch signal applied to the presented input interface diagram by a user after the verification diagram and the input interface diagram transmitted by the server are presented;

Step S703: transmitting sliding path information generated according to the touch signal to the server for verifying.

With the use of the method for verifying based on a verification diagram at the terminal, the sliding path information may be conveniently inputted on the input interface diagram by a touch action according to the verification diagram at the terminal, thereby reducing the misoperation and improving the convenience and accuracy of the verification.

The realization way of the verification diagram and the input interface diagram is identical with the above embodiment, and thereby is not repeated herein.

Figure 8:
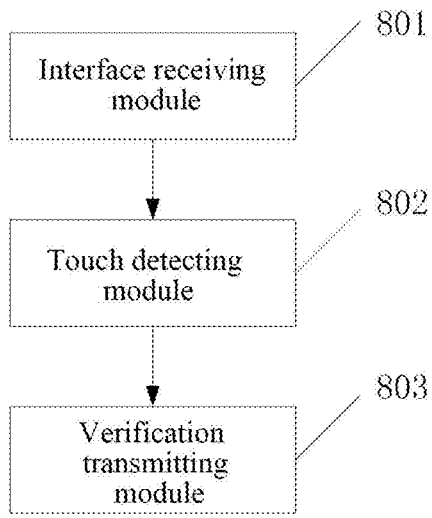
FIG. 8 is a schematic diagram of a device for verifying based on a verification diagram according to the sixth embodiment of the invention.

FIG. 8 illustrates the sixth embodiment of the invention.

FIG. 8 is a schematic diagram of a device for verifying based on a verification diagram according to the sixth embodiment of the invention, and the device is arranged at a terminal Referring to FIG. 8, the device includes: an interface receiving module 801, a touch detecting module 802 and a verification transmitting module 803. The interface receiving module 801 is configured for receiving the verification diagram and an input interface diagram from a server, the input interface diagram includes the basic information element of the verification diagram except for the verification information; the touch detecting module 802 is configured for detecting a touch signal applied to the presented input interface diagram by a user after the verification diagram and the input interface diagram transmitted by the server are presented; and the verification transmitting module 803 is configured for transmitting sliding path information generated according to the touch signal to the server for verifying.

With the use of the device for verifying based on a verification diagram at the terminal, the sliding path information may be conveniently inputted on the input interface diagram by a touch action according to the verification diagram at the terminal, thereby reducing the misoperation and improving the convenience and accuracy of verification.

The realization way of the verification diagram and the input interface diagram is identical with the above embodiment, and thereby is not repeated herein.

In the technical solution proposed by the invention, the verification diagram and the input interface diagram are transmitted to the terminal by the server, the terminal detects the touch signal applied to the input interface diagram by a user to generate the sliding path information, the server determines whether the sliding path information matches the verification information for verifying, so that it is realizable for the terminal user to input the verification information by performing only a sliding action on an input interface without inputting the character one by one through a terminal input keyboard, which can prevent the erroneous input of verification information caused by an erroneous touch of a terminal input keyboard, thereby improving the success rate of login authentication on a terminal user by a web-hosting server. Furthermore, the invention also provides the verification diagram with an indicative path, which is intuitive and easy to understand for the terminal user.

The embodiment of the invention also provides a storage medium containing computer-executable instructions, and the computer-executable instructions, when executed by a computer processor, are configured to perform a method for verifying based on a verification diagram, where the method is performed on a server and includes:

generating an input interface diagram according to a verification diagram including a basic information element and verification information, where the input interface diagram includes the basic information element of the verification diagram except for the verification information;

transmitting the verification diagram and the input interface diagram to a terminal;

receiving sliding path information inputted on the input interface diagram presented on the terminal; and determining whether the sliding path information matches the verification information, and if so, then the verification is successful.

The method for verifying based on a verification diagram, which is performed by the computer-executable instructions stored in the above storage medium, may be alternatively replaced by the method for verifying based on a verification diagram performed on the server as provided by any embodiment of the invention.

The embodiment of the invention also provides a storage medium containing computer-executable instructions, and the computer-executable instructions, when executed by a computer processor, are configured to perform a method for verifying based on a verification diagram, where the method is performed on a terminal and includes:

receiving a verification diagram and an input interface diagram from a server, where the input interface diagram includes a basic information element of the verification diagram except for verification information;

detecting a touch signal applied to the presented input interface diagram by a user after the verification diagram and the input interface diagram transmitted by the server are presented; and transmitting sliding path information generated according to the touch signal to the server for verifying.

The method for verifying based on a verification diagram, which is performed by the computer-executable instructions stored in the above storage medium, may be alternatively replaced by the method for verifying based on a verification diagram performed on the terminal as provided by any embodiment of the invention.

By the description of the above embodiments, it can be clearly understood for those skilled in the art that the invention may be realized by means of software and necessary general hardware, certainly, also may be realized by means of hardware, but in many cases the former is a best embodiment. Based on this understanding, the technical solution of the invention in essence or the part of the invention contributing to the prior art may be embodied in the form of software product. The computer software product may be stored in a computer readable storage medium, such as a computer's floppy disk, a Read-Only Memory (ROM), a Random Access Memory (RAM), a flash, a hard disk or a compact disk, including several instructions for making a computer device (may be a personal computer, a server or a network device, etc.) perform the methods described by various embodiments of the invention.

All or part of the above technical solution provided in the embodiments can be realized by software programming, the software program is stored in a readable storage medium such as the hard disk, the compact disk or the floppy disk in the computer.

The above description only shows some preferred embodiments of the invention, rather than limiting the scope of the invention. Any modification, equivalent transformations and improvement, etc. made within the spirit and principle of the invention should be included in the protection scope of the invention.

What is claimed is:

1. A method for verifying based on a verification diagram, wherein the method is performed on a server and comprises:

generating an input interface diagram according to a verification diagram, wherein the verification diagram includes a basic information element and verification information, and the input interface diagram includes the basic information element of the verification diagram except for the verification information, comprising:

generating at least more than one identified area on the input interface diagram, wherein the number of the more than one identified area is greater than or equal to that of sub-elements in the basic information element of the verification diagram, and the more than one identified area is arranged and displayed in an L×N matrix, wherein L and N are integers more than 1, respectively;

presetting randomly a sliding trace on the input interface diagram according to the verification diagram to generate the sliding path information, wherein the sliding trace is continuous, the number of identified areas passed through by the sliding trace is the same as that of the sub-elements in the basic information element of the verification diagram, and the sliding path information comprises a sequence of identified areas passed through successively by the sliding trace randomly preset;

displaying the sub-elements of the basic information element in the identified areas passed through by the sliding trace according to the verification information of the verification diagram, wherein each identified area displays one sub-element accordingly; and randomly displaying other sub-elements at identified areas not passed through by the sliding trace;

transmitting the verification diagram and the input interface diagram to a terminal;

receiving sliding path information inputted on the input interface diagram presented on the terminal; and determining whether the sliding path information matches the verification information, and if so, then the verification is successful.

2. The method for verifying based on a verification diagram according to claim 1, wherein, the basic information element comprises at least one sub-element, the verification information is a combination sequence of the at least one sub-element, and the at least one sub-element includes at least one from a group consisted of alphabets, digits and patters.

3. The method for verifying based on a verification diagram according to claim 2, wherein, the input interface diagram comprises at least one identified area, each of which is configured to display one sub-element, and sub-elements displayed by the at least one identified area include all the sub-elements in the basic information element.

4. The method for verifying based on a verification diagram according to claim 2, wherein, generating the input interface diagram according to the verification diagram including the basic information element and the verification information comprises:

generating at least more than one identified area on the input interface diagram, wherein the number of the more than one identified area is greater than or equal to that of the sub-elements in the basic information element of the verification diagram, and the more than one identified area is arranged and displayed in an L×N matrix, wherein L and N are integers more than 1, respectively;

presetting randomly a sliding trace on the input interface diagram according to the verification diagram to generate the sliding path information, wherein the sliding trace is continuous, the number of identified areas passed through by the sliding trace is the same as that of the sub-elements in the basic information element of the verification diagram, and the sliding path information comprises a sequence of identified areas passed through successively by the sliding trace randomly preset;

displaying the sub-elements of the basic information element in the identified areas passed through by the sliding trace according to the verification information of the verification diagram, wherein each identified area displays one sub-element accordingly; and randomly displaying other sub-elements at identified areas not passed through by the sliding trace.

5. The method for verifying based on a verification diagram according to claim 3, wherein, determining whether the sliding path information matches the verification information comprises: analyzing the sliding path information to obtain a sub-element combination sequence corresponding to the sliding path information; comparing whether the sub-element combination sequence is consistent with the verification information, and if so, determining that the sliding path information matches the verification information.

6. The method for verifying based on a verification diagram according to claim 3, wherein, generating the input interface diagram according to the verification diagram including the basic information element and the verification information comprises:

generating at least more than one identified area on the input interface diagram, wherein the number of the more than one identified area is greater than or equal to that of the sub-elements in the basic information element of the verification diagram, and the more than one identified area is arranged and displayed in an L×N matrix, wherein L and N are integers more than 1, respectively;

presetting randomly a sliding trace on the input interface diagram according to the verification diagram to generate the sliding path information, wherein the sliding trace is continuous, the number of the identified areas passed through by the sliding trace is the same as that of the sub-elements in the basic information element of the verification diagram, and the sliding path information comprises a sequence of identified areas passed through successively by the sliding trace randomly preset;

displaying the sub-elements of the basic information element in the identified areas passed through by the sliding trace according to the verification information of the verification diagram, wherein each identified area displays one sub-element accordingly; and randomly displaying other sub-elements at identified areas not passed through by the sliding trace.

7. The method for verifying based on a verification diagram according to claim 5, wherein, the sliding path information comprises the identified areas passed through successively by a sliding trace generated on the input interface diagram at the terminal.

8. The method for verifying based on a verification diagram according to claim 1, wherein, the basic information element comprises at least one identify area, and the verification information is a sequence of identified areas passed through successively by a preset sliding trace on the verification diagram.

9. The method for verifying based on a verification diagram according to claim 8, wherein, the input interface diagram comprises at least one identified area, and the identified areas of the input interface diagram are the same as those of the verification diagrams, respectively.

10. The method for verifying based on a verification diagram according to claim 9, wherein, the sliding path information comprises the identified areas passed through successively by a sliding trace generated on the input interface diagram at the terminal.

11. A device for verifying based on a verification diagram, wherein the device is arranged at a server and comprises:
a diagram generating module configured for generating an input interface diagram according to a verification diagram including a basic information element and verification information, wherein the input interface diagram includes the basic information element of the verification diagram except for the verification information wherein the diagram generating module is configured for:
generating at least more than one identified area on the input interface diagram, wherein the number of the more than one identified area is greater than or equal to that of the sub-elements in the basic information element of the verification diagram, and the more than one identified area is arranged and displayed in an L×N matrix, wherein L and N are integers more than 1, respectively;
presetting randomly a sliding trace on the input interface diagram according to the verification diagram to generate the sliding path information, wherein the sliding trace is continuous, the number of the identified areas passed through by the sliding trace is the same as that of the sub-elements in the basic information element of the verification diagram, and the sliding path information includes a sequence of identified areas passed through successively by the sliding trace randomly preset;
displaying the sub-elements of the basic information element in the identified areas passed through by the sliding trace according to the verification information of the verification diagram, wherein each identified area displays one sub-element accordingly; and
randomly displaying other sub-elements at the identified areas not passed through by the sliding trace;
a diagram transmitting module configured for transmitting the verification diagram and the input interface diagram to a terminal;
a path receiving module configured for receiving sliding path information inputted on the input interface diagram presented on the terminal; and
a verifying module configured for determining whether the sliding path information matches the verification information, and if so, then the verification is successful.

12. The device for verifying based on a verification diagram according to claim 11, wherein, the basic information element of the verification diagram comprises at least one sub-element, the verification information of the verification diagram is a combination sequence of the at least one sub-element, and the at least one sub-element includes at least one from a group consisted of alphabets, digits and patters.

13. The device for verifying based on a verification diagram according to claim 12, wherein, the input interface diagram comprises at least one identified area, each of which is configured to display one sub-element, and sub-elements displayed by the at least one identified area comprise all the sub-elements in the basic information element.

14. The device for verifying based on a verification diagram according to claim 13, wherein, the verifying module is configured for analyzing the sliding path information to obtain a sub-element combination sequence corresponding to the sliding path information; comparing whether the sub-element combination sequence is consistent with the verification information, and if so, determining that the sliding path information matches the verification information.

15. The device for verifying based on a verification diagram according to claim 14, wherein, the sliding path information is a sequence of identified areas passed through successively by a sliding trace generated on the input interface diagram at the terminal.

16. The device for verifying based on a verification diagram according to claim 11, wherein, the basic information element of the verification diagram comprises at least one identify area, and the verification information of the verification diagram is a sequence of identified areas passed through successively by the preset sliding trace on the verification diagram.

17. The device for verifying based on a verification diagram according to claim 16, wherein, the input interface diagram comprises at least one identified area, the identified areas of the input interface diagram are the same as those of the verification diagrams, respectively.

18. A method for verifying based on a verification diagram, wherein the method comprises:
generating an input interface diagram according to a verification diagram in server, wherein the verification diagram includes a basic information element and verification information, and the input interface diagram includes the basic information element of the verification diagram except for the verification information, comprising:
generating at least more than one identified area on the input interface diagram, wherein the number of the more than one identified area is greater than or equal to that of sub-elements in the basic information element of the verification diagram, and the more than one identified area is arranged and displayed in an L×N matrix, wherein L and N are integers more than 1, respectively;
presetting randomly a sliding trace on the input interface diagram according to the verification diagram to generate the sliding path information, wherein the sliding trace is continuous, the number of identified areas passed through by the sliding trace is the same as that of the sub-elements in the basic information element of the verification diagram, and the sliding path information comprises a sequence of identified areas passed through successively by the sliding trace randomly preset;
displaying the sub-elements of the basic information element in the identified areas passed through by the sliding trace according to the verification information of the verification diagram, wherein each identified area displays one sub-element accordingly; and
randomly displaying other sub-elements at identified areas not passed through by the sliding trace;
receiving the verification diagram and the input interface diagram from the server, wherein the input interface diagram comprises the basic information element of the verification diagram except for verification information;
detecting a touch signal applied to the presented input interface diagram by a user after the verification diagram and the input interface diagram transmitted by the server are presented; and
transmitting sliding path information generated according to the touch signal to the server for verifying.

* * * * *